US011238383B2

(12) United States Patent
Mansour et al.

(10) Patent No.: US 11,238,383 B2
(45) Date of Patent: Feb. 1, 2022

(54) SYSTEMS AND METHODS FOR CREATING AND MANAGING USER TEAMS OF USER ACCOUNTS

(71) Applicant: ATLASSIAN PTY LTD, Sydney (AU)

(72) Inventors: Sherif Mansour, Peakhurst (AU); Sidney Gee-Lake Shek, Carlingford (AU); Ashwin Srinivasan, West Pennant Hills (AU); Roaan Vos, Woollahra (AU); Ernest Wong, Waverton (AU)

(73) Assignee: ATLASSIAN PTY LTD., Sydney (AU)

( * ) Notice: Subject to any disclaimer, the term of this patent is extended or adjusted under 35 U.S.C. 154(b) by 214 days.

(21) Appl. No.: 15/623,344

(22) Filed: Jun. 14, 2017

(65) Prior Publication Data
US 2018/0365627 A1 Dec. 20, 2018

(51) Int. Cl.
G06Q 10/06 (2012.01)
(52) U.S. Cl.
CPC ........... G06Q 10/063118 (2013.01); G06Q 10/06393 (2013.01)
(58) Field of Classification Search
USPC ........................................... 705/7.17
See application file for complete search history.

(56) References Cited

U.S. PATENT DOCUMENTS 8,566,146 B1 * 10/2013 Hurewitz ............ G06Q 40/06
705/7.38
9,268,763 B1 * 2/2016 Esho ..................... G06F 16/93
9,773,229 B2 * 9/2017 Merom ................ G06Q 10/10
10,318,914 B1 6/2019 Arora
2002/0075303 A1 6/2002 Thompson et al.
2007/0255715 A1 11/2007 Li et al.
2009/0125529 A1 * 5/2009 Vydiswaran ........ G06F 16/951
2013/0091149 A1 * 4/2013 Dunn .................. G06Q 10/101
707/749
2014/0025748 A1 * 1/2014 Mallet ................. G06Q 50/01
709/204

(Continued)

OTHER PUBLICATIONS

Mansour, U.S. Appl. No. 15/623,336, filed Jun. 14, 2017, Office Action, dated Jun. 27, 2019.

Primary Examiner — Folashade Anderson
(74) Attorney, Agent, or Firm — Brownstein Hyatt Farber Schreck, LLP

(57) ABSTRACT

Methods and systems for suggesting electronic collaborative user groups to a user account based on user account activity. The method includes identifying one or more event records corresponding to a user account. Each of the one or more event records identifying an interaction between a client device of the user account and a server computing system and corresponding to one or more themes associated with a given team. The method further includes calculating a theme score for the user account based on the retrieved one or more event records. The theme score based at least in part on the number of identified event records. The method also includes determining whether the calculated theme score exceeds a predetermined threshold score, and in response to determining that the calculated theme score exceeds the predetermined threshold score, facilitating connection of the user account and the team associated with the theme.

19 Claims, 10 Drawing Sheets

(56) References Cited

U.S. PATENT DOCUMENTS

| | | | | |
|---|---|---|---|---|
| 2014/0067826 A1* | 3/2014 | Jackson | ................ | G06Q 50/01 |
| | | | | 707/748 |
| 2014/0201261 A1* | 7/2014 | Su | ..................... | H04L 67/306 |
| | | | | 709/203 |
| 2014/0317000 A1* | 10/2014 | Lundberg | ............ | G06Q 50/184 |
| | | | | 705/310 |
| 2015/0261756 A1* | 9/2015 | Klemm | ............ | G06F 16/24578 |
| | | | | 707/723 |
| 2017/0220935 A1* | 8/2017 | Gerrard | ................ | G06N 20/00 |
| 2018/0191903 A1* | 7/2018 | Yokel | ............... | H04M 3/42068 |
| 2018/0365626 A1 | 12/2018 | Mansour | | |
| 2020/0280565 A1* | 9/2020 | Rogynskyy | ........... | H04L 67/303 |

* cited by examiner

Figure 10

TEAM DASHBOARD

MY IMPLICIT TEAMS

Team "HipChat APIs"

Recent Activity:

UserABC shared https://dhf.ioruw.kjshd/92347
UserCDE "@HipChat APIs check out this page on the new API protocols adopted by ModTalk"

Team "Mt Kanchenjunga"

Recent Activity:
UserXYZ: "@Mt Kanchenjunga checkout the latest weather details here"
UserUOV: "@Mt Kanchenjunga anyone interested in a 21 day trek in August?"

Team XYZ

Recent Activity:
UserXXX: "XXXXXXXXXXXXXXXXX"
UserYYY: "XXXXXXXXXXXXXXXXX"
UserZZZ: "XXXXXXXXXXXXXXXXX"

---

Team "Mt Kanchenjunga"

Team information:
Status: Active  [Formalization?]
Created on: 17/02/2017
Active Members: 6
Team Members: UserXYZ
  UserUOV
  UserABC
  UserMOB
  UserDEF
  UserMNO Total events: 145
Recent Activity: UserXYZ: "@Mt Kanchenjunga checkout the latest weather details here"

UserUOV: "@Mt Kanchenjunga anyone interested in a 21 day trek in August?"

User MNO: "@Mt Kanchenjunga Kathmandu has a 50% discount on camping equipment for the next 7 days"

[Stop following]

SYSTEMS AND METHODS FOR CREATING AND MANAGING USER TEAMS OF USER ACCOUNTS

TECHNICAL FIELD

Aspects of the present disclosure are directed to automatic creation and/or management of dynamic user teams in computer networks.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

A user team (that represents a collection of user accounts with similar duties or interests) is typically created to provide the same access rights to the user accounts of that team. For example, if an organization wishes to assign full access to a file folder for its marketing department, the organization can create a team that includes the user accounts in the marketing department and then assign that team full access to the folder.

However, creating teams can often be time-consuming or difficult, especially if it is not readily apparent who the team members should be. Further, some teams may form around particular subject areas, content and/or context. For example, a team may be formed to work on a particular project or collaborate on a particular software tool. These teams may not be recognized outside the context of their particular project or software tool, for example.

Moreover, managing teams becomes difficult because teams often form and dissolve organically and don't necessarily follow organizational hierarchies. Accordingly, an administrator is typically required to audit the team from time to time to determine whether any new members should be added to the team or any inactive members should be removed from the team. This audit can sometimes be inaccurate, difficult, and time-consuming.

SUMMARY

The appended claims may serve as a summary of the invention.

BRIEF DESCRIPTION OF THE DRAWINGS

In the drawings:

FIG. 10 is an example team management user interface according to some embodiments of the present disclosure.

Figure 1:
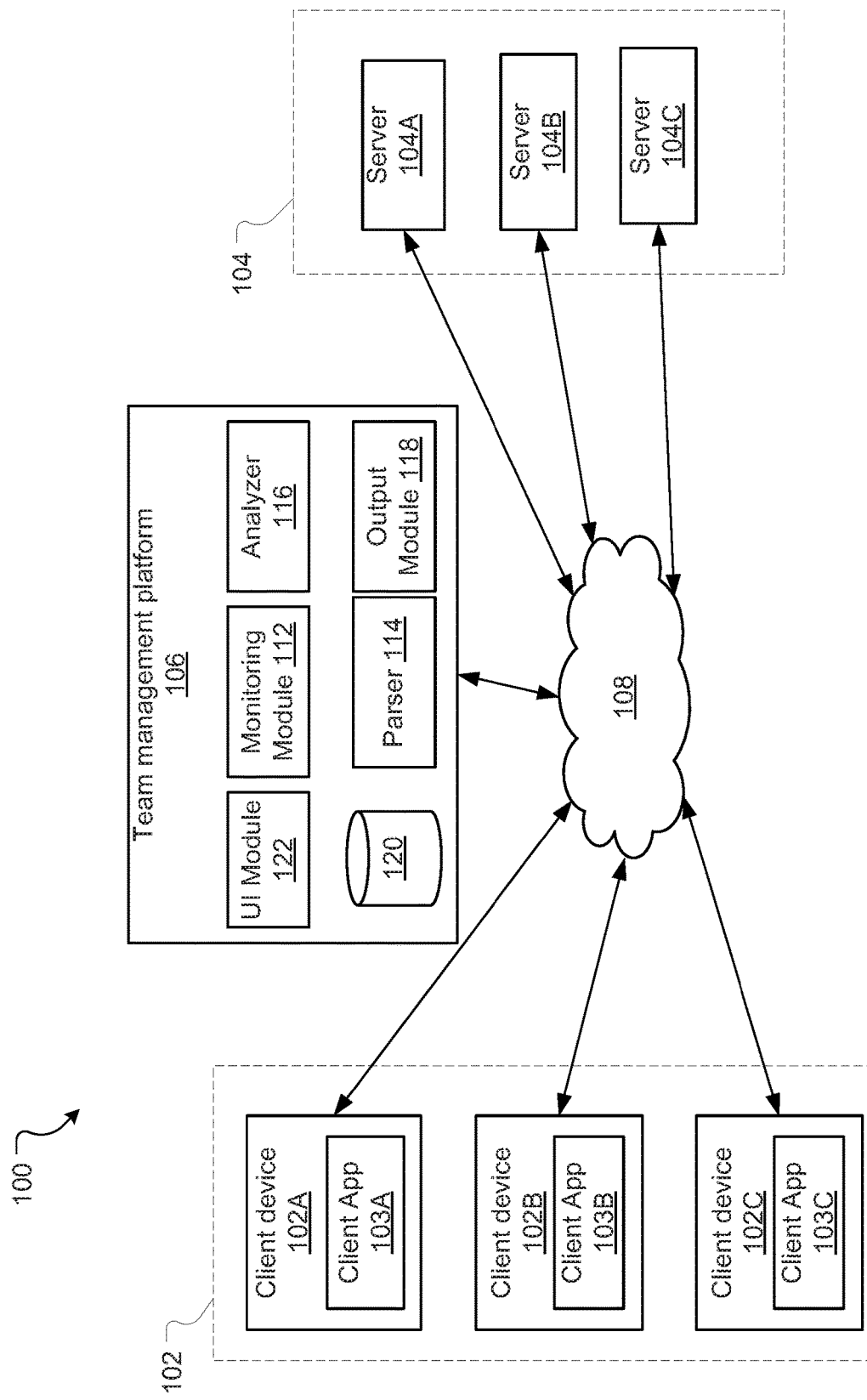
FIG. 1 is a block diagram of a networked environment according to some embodiments of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As it so happens, different people often get interested in the same topic—for example, two or more people may be interested in learning how to setup an API for a particular software application, or how to top off a bouldering problem. Similarly, other people may be interested in a particular software module of an upcoming software application, or the launch of a new video game. In large multinational organizations, or even across organizations, these people are not always aware of each other. For example a team in a particular business unit may not be aware that a team in a different business unit is tasked with solving a similar problem or is interested in the same topic as them.

Furthermore, even if people become aware of other people interested in a particular topic, it is often difficult for these people to collaborate and share data beyond the particular forum on which they become acquainted. For example, user accounts may post messages on a particular forum that other user accounts of the forum may view and interact with, but it becomes very difficult for these user accounts to share data with forum members on a different platform.

To address one of more of these issues, embodiments of the present disclosure provide for the automatic creation of implicit teams. An implicit team as used herein is an automatically created, dynamic, and informal grouping of two or more user accounts that are determined to be associated with the same or similar "theme". As opposed to formal/formalized teams that typically have a team administrator for manual identification/invitation of members, implicit teams do not require an administrator.

In addition to creating implicit teams, disclosed embodiments extend to creating user interfaces, such as dashboards, for user accounts to view implicit team(s) they are members of, top trending implicit teams, and so on. This may involve, for example, identifying the implicit teams a user account is a member of (or the implicit teams with the highest user account activity) and retrieving/displaying the latest activity of members in those teams. From the user interface, user accounts may also be able to manage implicit teams they are members of. For example, a user account may request to be removed from an implicit team that the associated user does not wish to be a member of, or suggest formalization of an implicit team into a formal team.

Using implicit teams, members may be able to collaborate and share information with each other. In one example, this may be done by using an implicit team name/handle to link a post or comment to the implicit team profile, or to share a particular article, comment, or post with the team. When the team name/handle is used this way, members of the implicit team may be notified of the mentions or shares (for example via the implicit team user interface) and can communicate and interact with one another in a more efficient manner.

Further, as described previously, implicit teams are dynamic—i.e., membership of these teams may vary from time to time. If one or more user accounts were identified as being members of an implicit team stop participating or are no longer interested in the theme around which that implicit team was created, these user accounts may be automatically removed from the implicit team. Similarly, if other user accounts are identified as being interested in a particular theme, these user accounts may be automatically added to a preexisting implicit team created around that theme.

As used herein, the term "theme" refers to an idea, subject, topic, type of communication, or even a platform that connects two or more user accounts. A theme is the underlying common factor on which am implicit team is based. In some cases, a theme may be a particular software service, platform, or container (e.g., a chatroom or a forum) on which users associated with corresponding user accounts exchange ideas. In other cases, a theme may be a particular topic or subject. In yet other cases, a theme may be based on the people that directly communicate with one another (e.g., via emails). Alternatively, themes could be based on similar roles/titles, organizational hierarchy, etc. It will be appreciated that a theme may also be a combination of these different types (platforms, topics, and/or people) without departing from the scope of the present disclosure.

Themes could also be identified around incidents. For example, during an incident (when something in the system breaks and/or has large scale impact) a certain "group" of people may be brought together to help resolve issues associated with the incident. Incidents could thus be a theme as similar types of incidents would typically involve the same people (implicit team).

Generally speaking, implicit teams are created based on user account activity. To that end, embodiments disclosed herein involve monitoring the activity of user accounts in a computer network and identifying one or more themes from the monitored activity. The themes are then analyzed and user accounts associated with the same or similar themes are automatically grouped into an implicit team (if their activity matches certain implicit team creation rules).

In addition, aspects of the present disclosure extend to managing the created implicit teams. To that end, member activity within teams (implicit and/or formal teams) and non-member activity in the computer network is monitored. If a member's activity matches certain removal rules (e.g., if the member is inactive for a predetermined period of time), the member may be automatically removed from the corresponding implicit team. Alternatively, if a non-member's activity matches certain member addition rules (e.g., if the activity of a non-member matches the theme of a particular team and exceeds a threshold amount), the non-member may be automatically added to that particular implicit team. In a similar fashion, if the activity relating to an implicit team as a whole falls below a threshold activity level, the implicit team may be automatically dissolved.

Further aspects of the present disclosure allow for an implicit team to be changed to a formal team. To that end, team activity is monitored, e.g., through usage of the implicit team identifier/handle. If the team activity exceeds a threshold in a particular period of time, members may be notified of this and a suggestion may be made to formalize the implicit team, for example, by assigning permissions to team members and/or nominating an administrator.

In yet other aspects of the present disclosure, one or more formal teams may be suggested to a user account or a recommendation may be made to a formal team to add one or more user accounts. To this end, user account activity is monitored to determine whether recommendation rules are met. If so, a suggestion is made to the user account to request addition to the formal team or a recommendation is made to the formal team to add the user account as a new member. Using these techniques, users may be made aware of formalized teams that are interested in the same themes as the user account and/or formalized teams may be made aware of user accounts that are talking about similar topics as the formalized team thereby allows user accounts and teams to connect with one another.

These and other aspects of the present disclosure will be described in detail with reference to FIGS. 1-10 below.

Environment Overview

FIG. 1 illustrates an environment 100 in which one or more aspects of the present disclosure are implemented. Specifically, FIG. 1 illustrates the systems involved in creating, maintaining and managing implicit teams. The systems include client devices (e.g., client devices 102A, 102B, and 102C, collectively referred to as client devices 102), servers (e.g., servers 104A, 104B, 104C, collectively referred to as servers 104), and a team management platform 106. The client devices 102, servers 104, and team management platform 106 communicate with each other over one or more communication networks 108.

Generally speaking, users of client devices 102 are associated with a user account and generate electronic activity. This activity includes any type of user account interaction with the servers 104, including interaction with content and/or software applications hosted by the servers 104. Example interactions include exchanging emails and/or documents, writing posts, commenting on content, visiting web pages, sharing, liking, or viewing content, communicating with user accounts in a real-time chat interface, etc. The team management platform 106 (in communication with the servers 104) detects, parses, logs, and analyses this user account activity to create and manage implicit teams.

The client device 102 may be any suitable device, for example a mobile device (e.g. a tablet or mobile phone), a portable device (such as laptop computer), or any other computing device (e.g. a desktop computer).

As illustrated in FIG. 1, each client device 102 includes one or more client (software) applications (e.g., client applications 103A, 103B, and 103C) that are configured to access implicit team information made available by the team management platform 106. The client applications 103 include instructions and data stored in the memory (e.g. non-transient compute readable media) of the client devices 102 on which the applications are installed/run. These instructions are executed by a processor of the client device 102 to perform various functions as described herein. By way of example, some functions performed by the client application 103 include communicating with the team management platform 106, rendering a user interface presenting the latest team information (e.g., profiles of implicit teams a user account is a member of) based on instructions received from the team management platform 106, receiving inputs from user accounts and communicating these inputs to the team management platform 106.

In addition to client applications 103 that access implicit team information, each client device 102 may further include one or more client applications configured to access software applications made available by the servers 104. In this case, the client applications may communicate with applications hosted by the servers 104, render user interfaces based on instructions received from those applications, and receive inputs from user accounts allowing them to interact with the applications hosted by the servers 104.

The client applications 103 may be implemented in various ways. For example, the client applications may be web browser applications (such as, for example, Chrome, Safari, Internet Explorer, Opera) which access the applications hosted by the servers 104 and/or the team management platform 106 via appropriate uniform resource locators (URL) and communicates with these systems via general world-wide-web protocols (e.g. HTTP, HTTPS, FTP). In this case the web browser application is configured to request, render and display user interfaces that conform to a markup language such as HTML, XML or extensions, and may be capable of internally executing browser-executable code such as JAVASCRIPT, or other forms of code. Alternatively, the client applications may be specific applications programmed to communicate with the servers 104 and/or the team management platform 106 using defined application programming interface (API) calls.

In general, each server 104 is a system entity that hosts one or more software applications (e.g., applications 120A and 120B) and/or content. A user (not shown) associated with a user account may access applications or content hosted by a server using the client application 103 on their user device 102.

The team management platform 106 as described previously is configured to create and manage implicit teams. To that end, the team management platform 106 includes a monitoring module 112 configured to monitor user account activity on the one or more servers 104, a parser 114 configured to parse the monitored user account activity to identify themes and log the parsed user account activity, and an analyzer 116 configured to analyze the logged user account activity in order to create and/or manage implicit teams. The team management platform 106 further includes an output module 118 configured to create and/or update implicit teams based on the analysis performed by the analyzer 116.

In certain embodiments, the analyzer 116 is configured to analyze user account activity to determine whether it corresponds to one or more formal teams and the output module 118 is configured to connect the user account with those formal teams. For example, it may suggest new team members to the formal team, and/or notify user accounts of the formal teams, thereby allowing users and their associated user accounts to join teams they might be interested in.

In addition to these modules, the team management platform 106 may include or be operatively coupled to one or more databases 120 that store activity data, theme data, and team data, and a user interface module 122 configured to communicate with the client applications 103 to allow user accounts to manage/view/edit one or more implicit teams they are members of.

As illustrated in FIG. 1, communications between the client devices 102, servers 104, and team management platform 106 are via the communications network 108. For example, the client devices 102, servers 104 and team management platform 106 may communicate with each other through a local area network (LAN) or a public network (e.g., the Internet). Furthermore, the servers 104 may communicate with the team management platform 106 over open web protocols such as (HTTPS, REST, and JWT).

It will be appreciated that although only three client devices (102A, 102B and 102C) and three servers 104 have been illustrated, in normal operation, many more client devices 102 and servers 104 may be connected to the identity platform through the network 108.

Hardware Overview

The operations/techniques described herein are implemented by one or more special-purpose computing systems or devices. For example, in environment 100: the team management platform 106 may be provided by one or more computer systems; each client device 102 is a computer system; and each of the servers 104 are provided by one or more computing systems.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 2:
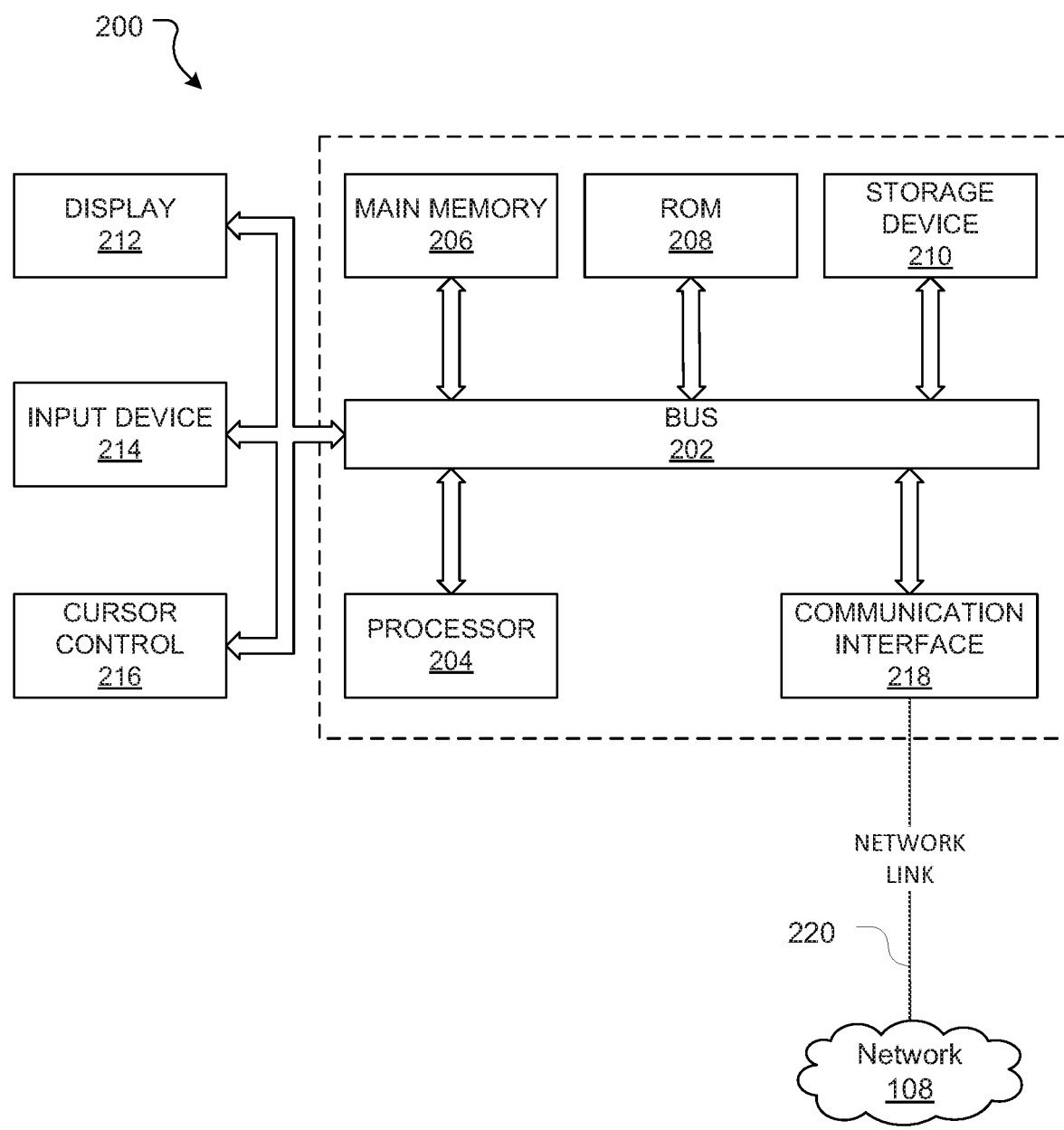
FIG. 2 is a block diagram of a computing system with which various embodiments of the present disclosure may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions. If the computer system 200 is part of the team management platform 106, the storage device 210 may store database 120.

In case the computer system 200 is the client device 102, it may be coupled via bus 202 to one more output devices such as a display 212 for displaying information to a computer user. Display 212 may, for example, be a cathode ray tube (CRT), a liquid crystal display (LCD), a light emitting diode (LED display), or a touch screen display. An input device 214, including alphanumeric and other keys, may be coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that permits the device to specify positions in a plane. Additional and/or alternative input devices are possible, for example touch screen displays.

According to one embodiment, the methods disclosed herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 2504 retrieves and executes the instructions. The instructions received by main memory 206 may optionally be stored on storage device 210 either before or after execution by processor 2504.

Computer system 200 also includes a communication interface 218 coupled to bus 202. Communication interface 218 provides a two-way data communication coupling to a network link 220 that is connected to network 108. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks 108 to other computing systems. For example, if the computing system 200 is part of the identity platform 104, the network link 220 may provide a connection through network 108 to client device 102 or service providers 106.

Computer system 200 can send messages and receive data, including program code, through the network(s), network link 220 and communication interface 218. In the team management platform example, the monitoring module 112 may receive information about user activity through the network 108 and communication interface 218 from the server 104A.

The processor 204 of the service provider may execute the received access identifier as it is received, and/or store it in storage device 210, or other non-volatile storage for later execution.

Exemplary Data Structures

This section describes data structures employed by the team management platform 106 to create and/or manage implicit teams. The data structures and fields described are provided by way of example. Depending on the implementation, additional, fewer, or alternative fields may be used. Further, the fields described in respect of a given data structure may be stored in one or more alternative data structures (e.g. across multiple linked data structures). Further, although tables are used to illustrate the data structures, the relevant fields/information may be stored in any appropriate format/structure.

As noted previously, users (on their client devices 102 and through an associated user account) may interact with content and/or applications hosted by one or more servers 104. Each time a user account interacts with a server 104 an event is generated. As referred to herein, an event is an interaction between a user account and content/applications hosted by a server 104. Examples of events include, without limitation: sending and receiving emails; posting messages in an interactive chat application (e.g., HipChat), a social media application, a forum, or a blog; liking, sharing, mentioning, or responding to posts; creating, editing, commenting on pages in a wiki (e.g., Atlassian Confluence), interacting with an SCM system (e.g., Bitbucket), etc. This list of example events is non-exhaustive and any other type of interaction with the servers (e.g., raising an incident ticket in an issue tracking application such as JIRA) can also be considered within the scope of the term "event".

When an event is detected, the server 104 on which the event occurs generates information in respect of the event for the team management platform 106. As described below, this information may be automatically sent by the server 104 to the team management platform 106 (on an event-by-event basis or a batched basis), or may be provided to the team management platform 106 when requested. The team management platform 106 records relevant event information in the form of event records in one or more data structures. Each event record may store relevant event information for an event.

Table A illustrates an example event data structure maintained by the team management platform 106:

TABLE A

Event data structure

| Event ID | Type ID | User ID | Org. ID | Timestamp | Object identifier | Content Link | Message |
|---|---|---|---|---|---|---|---|
| 2352 | 2 | 3479 | 56 | 12:32 11/04/2017 | http://www.hipchat.com/room39473 | http://www.hipchat.com/room39473 | <message> |
| 2353 | 4 | 2973 | 56 | 12:33 11/04/2017 | http://www.jira.com/incident4830/ticket9847 | — | <message> |
| 2354 | 6 | 4897 | 45 | 12:33 11/04/2017 | http://www.hipchat.com/room39473 | http://www.hipchat.com/room39473 | <message> |
| 2355 | 4 | 3640 | 34 | 12:34 11/04/2017 | http://www.bamboo.com/blog/83947/aide | http://www.bamboo.com/blog/83947/aide | <message> |
| ... | ... | ... | ... | ... | ... | ... | ... |

In the example event data structure, for each unique event record, the following information is stored:

An event ID to uniquely identify the event.

A type ID to identify the type of event (e.g., post, message, comment, share, like, mention, object access, etc.). In this example the type ID is an identifier that links to an event type data structure as described below.

A user ID to uniquely identify the user account responsible for the event.

An organization ID to uniquely identify the organization the user account responsible for the event is affiliated with.

A timestamp indicating the time when the event was generated or recorded.

An object identifier indicating the specific object in respect of which the event relates—e.g. a webpage, chat room, email, code repository, container, issue tracking ticket or other object.

A content link providing a link to the actual content of the event (if any)—e.g. the content of a posted message, page edit etc.

A message associated with the event that provides a summary of the event. In certain embodiments, the message can be parsed to identify themes.

As noted previously, the team management platform 106 identifies themes from the user account activity (or events). The identified themes may be recorded in a theme data structure. Table B illustrates an example theme data structure that stores information in respect of themes identified by the team management platform 106.

TABLE B

Theme data structure

| Theme ID | Theme description | Theme type | Created |
|---|---|---|---|
| 1 | HipChat enhancements | Content based | 13/06/2014 |
| 2 | RESTful API | Content based | 16/09/2015 |
| 3 | http://www.hipchat.com/chat82364 | Object based | 11/04/2016 |
| 4 | http://www.confluence.com/blogpost/38461 | Object based | 21/04/2016 |
| 5 | User accounts 2183, 3497 and 9237 | Context based | 13/04/2017 |
| ... | ... | | ... |

For each theme, the theme data structure stores:

A theme ID for uniquely identifying for the theme.

A theme description, for example the theme identified by the parser 116.

A theme type. In certain embodiments themes are divided into content themes and metadata themes. Metadata themes can further be divided, for example into object themes and context themes. Accordingly, this field may store the value of the type of identified theme.

A creation timestamp, i.e. the time the theme was first identified and recorded.

In addition to the theme data structure, the team management platform 106 also maintains a data structure for recording information about the events from which the themes were identified. Table C illustrates an example theme activity data structure, which stores information on events and which theme(s) those events relate to.

TABLE C

Theme activity data structure

| Unique ID | Theme ID | Event ID |
|---|---|---|
| 1 | 1 | 2352 |
| 2 | 2 | 2353 |
| 3 | 4 | 2354 |
| 4 | 2 | 2355 |
| 5 | 3 | 2355 |
| ... | ... | ... |

For each record, the theme activity data structure may store:

A unique identifier to uniquely identify the record.

A theme ID of the theme associated with the event.

An event ID that uniquely identifies the event. In the present example the event ID links back to the event data structure as described above.

The team management platform 106 also maintains a data structure defining various event types. Table D illustrates an example event type data structure that stores event types and their corresponding event IDs.

TABLE D

Event type data structure

| Type ID | Event Type |
|---|---|
| 1 | Comment |
| 2 | Post |
| 3 | Message |
| 4 | Mention |
| 5 | Share |
| 6 | Like |
| 7 | View |
| ... | ... |

In some embodiments, events may be assigned varying importance (weights) based on their type. For example, event types that represent more involved interactions (e.g., comments, blog, or posts) may be assigned higher weights (greater importance) than event types that represent less involved interactions (e.g., liking, sharing, viewing or mentioning something). In this case the event type data structure may also store the weightings for each different event type, as shown in Table E:

TABLE E

Event type data structure with weightings

| Type ID | Event Type | Weighting Factor |
|---|---|---|
| 1 | Comment | 1 |
| 2 | Post | 1 |
| 3 | Message | 1 |
| 4 | Mention | 0.8 |
| 5 | Share | 0.8 |
| 6 | Like | 0.5 |
| 7 | View | 0.3 |
| ... | ... | ... |

In addition to the data structures used to store theme-related data, the team management platform 106 manages data structures to store information about implicit teams. Table F provides an example of such a data structure:

TABLE F

Implicit team data structure

| Implicit team ID | Team name/handle | Theme ID | Status |
|---|---|---|---|
| 23 | API | 1 | Active |
| 24 | Bitbucket | 2 | Inactive/disabled |
| 25 | Boot | 3 | Formalized |
| 26 | Confluence | 4 | Active |
| ... | ... | ... | ... |

For each implicit team, the implicit team data structure stores:

An implicit team ID for uniquely identifying the implicit team.

A team name/handle which may, but need not be the same as the theme description on which the implicit team is based.

A theme ID indicating the theme for which the implicit team was created. In this example the theme ID is an identifier that links back to a theme data structure as described above.

A status of the implicit team. Implicit teams may, for example, be active (e.g., if user account activity is regularly detected for a team), inactive (e.g., if no user account activity has been detected for some time) or formalized (e.g., if the implicit team is converted into a formal team which is no longer managed by the team management platform 106).

Table G provides an example of an implicit team membership data structure for recording the member of the various implicit teams:

TABLE G

Implicit team membership data structure

| Unique ID | Implicit team ID | User ID | Last Joined | Last removed |
|---|---|---|---|---|
| 1 | 23 | 2846 | 11/04/2016 | — |
| 2 | 23 | 2867 | 21/07/2016 | 21/04/2017 |
| 3 | 23 | 2987 | 21/02/2017 | — |
| 4 | 24 | 3021 | 06/04/2017 | — |
| ... | ... | ... | ... | ... |

In table G, for each record, the implicit team membership data structure stores:

A unique identifier for the record.

An implicit team ID for uniquely identifying the implicit team. In this case the implicit team ID a unique identifier that links back to an implicit team data structure as described above.

A user ID for uniquely identifying a particular user account.

A last joined date field recording the date on which the member was last added to the implicit team (discussed further below).

A last removed date field recording the date on which the member was last removed from the implicit team (discussed further below).

Implicit teams are dynamic in that members may be repeatedly removed and added based on their activity. In this example the last joined date and last removed dates of a given user account for a given team are recorded in the implicit team membership data structure. If the date in the last removed date field is later than the date in the last joined date field, the user account is not currently a member of the implicit team. Alternatively, if the date in the last joined field is later than the date in the last removed date field (or no date is recorded in the last removed date field), the user account is a current/active member of the implicit team.

The example data structures described above (e.g. Table F) presume a 1:1 mapping between themes and teams. In certain embodiments, however, this may be a 1:M or M:1 mapping (i.e. one theme may be associated with multiple teams and/or one team may be associated with multiple themes). In this case, instead of a single data structure such as Table F above, alternative data structures may be used to track team to theme associations (and associated data). Tables H and I provide examples of such alternative data structures.

Table H is an example data structure for storing team data:

TABLE H

Implicit team data structure

| Implicit team ID | Team name/handle | Status |
|---|---|---|
| 23 | Blue | Active |
| 24 | Red | Inactive/disabled |
| 25 | Green | Formalized |
| 26 | Black | Active |
| ... | ... | ... |

Table H is similar to Table F described above, however does not include a theme identifier in respect of each record.

Table I is an example data structure for storing the associations between teams and themes:

TABLE I

Team/theme associations

| Unique ID | Implicit Team ID | Theme ID |
|---|---|---|
| 001 | 23 | 1 |
| 002 | 23 | 2 |
| 003 | 24 | 2 |
| 004 | 25 | 3 |
| ... | ... | ... |

In Table I, each record defines a team/theme relationship and includes:

A unique identifier for the record.

An implicit team identifier for uniquely identifying an implicit team (linking, in this example, back to an implicit team data structure such as that shown in Table H).

A theme identifier for uniquely identifying a particular team (linking, in this example, back to a theme data structure such as that shown in Table B).

As can be seen in Table I, a single team (e.g. team 01) can be associated with multiple themes (e.g. themes 1 and 2). Similarly, a single theme (e.g. theme 2) can be associated with multiple teams (e.g. teams 23 and 24).

As noted, additional data structures to those shown above may be used in implementing the embodiments described herein. For example, while no user account data structure has been shown such a structure would typically be used in order to associate unique user account identifiers with their relevant details.

Exemplary Methods

This section describes various methods and processes for creating and managing implicit teams. Generally speaking, the implicit team creation and management processes can be split into a number of smaller processes—a process for identifying themes, a process for creating/updating one or more implicit teams, processes for adding and/or removing user accounts, and a process for managing teams (e.g., changing team status). For descriptive purposes, each of these processes will be described independently. However, in some embodiments these processes can be joined, such that the output of one process is the input for another process.

Identifying Themes from User Account Activity

Figure 3:
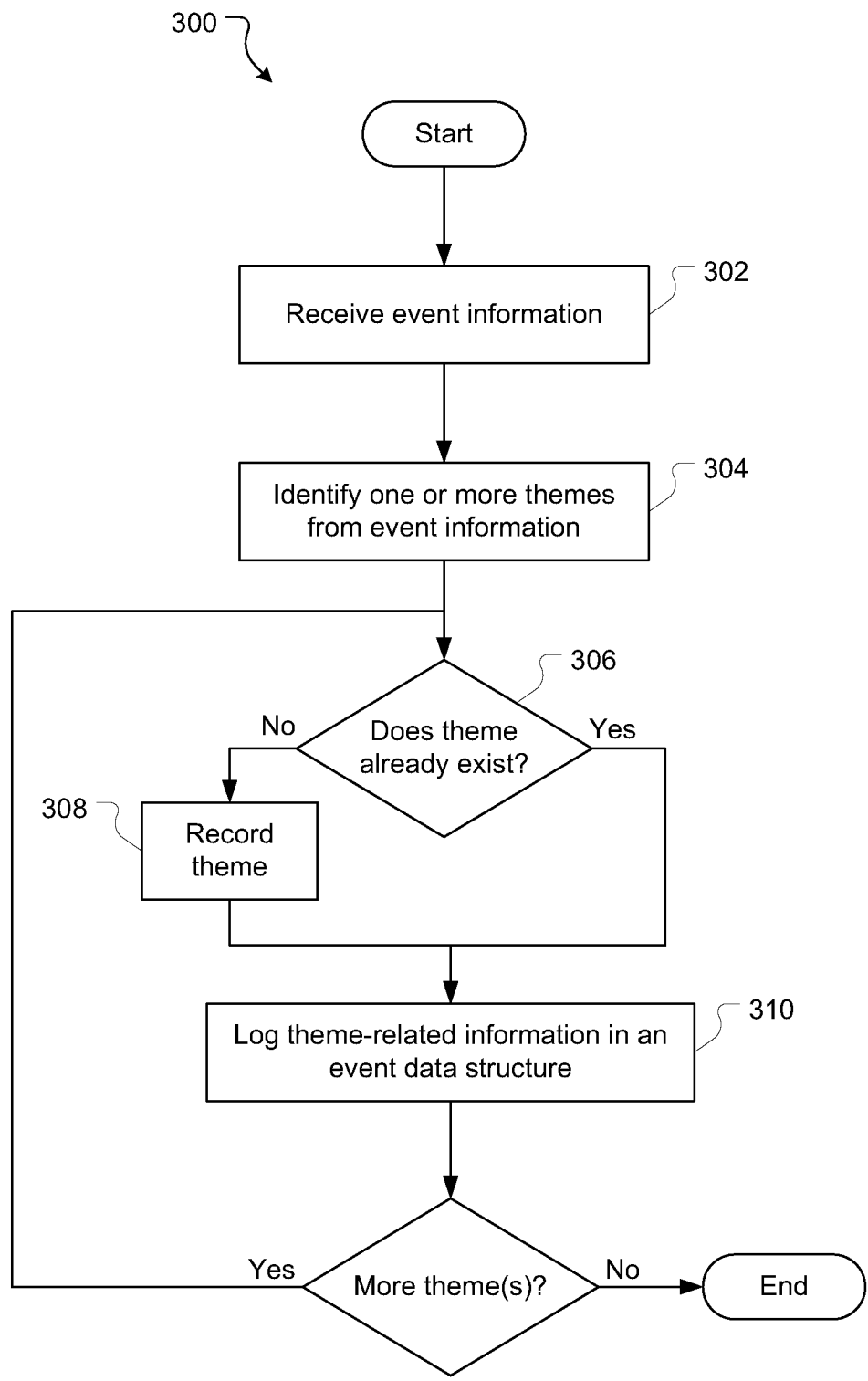
FIG. 3 is a flowchart illustrating a method for identifying one or more themes according to some embodiments of the present disclosure.

FIG. 3 illustrates an exemplary method 300 for identifying themes in user account activity. Although method 300 is described with reference to a single event of monitored user account activity, it will be appreciated that in practice this method can be repeated for other events.

The method begins at step 302, where information about an event is received at the team management platform 106 and particularly at the monitoring module 112.

In certain embodiments, the servers 104 push event information to the monitoring module 112 either in real time (i.e., whenever an event occurs) or at predetermined intervals (e.g., every 15 minutes, every hour, etc.). In case event information is pushed at predetermined intervals, the team management platform 106 receives a batch of event data for events that were generated during that interval.

In other embodiments, the monitoring module 112 may pull event data from the servers 104 in real time (e.g., by utilizing webhooks (programmed into the software applications and tools hosted by the servers 104) that notify the team management platform 106 when events occur at the servers 104) or by requesting each of the servers 104 at predetermined intervals (e.g., every minute, every 5 minutes, etc.) to provide information on events that were generated in that interval.

In any case, for an event, the team management platform 106 receives relevant data in respect of the event which may, depending on the implementation, include metadata and/or content. The team management platform 106 stores this received event data in the event data structure (e.g., Table A).

At step 304, the event is analyzed to identify one or more themes. Themes can be identified from two main categories of event information—the actual content of an event, or the metadata about the event (e.g., object associated with an event, or people involved in an event). Themes identified from the content of an event may be indicative of the main subject or topic of the content, whereas the themes identified from the metadata may simply be the value of a particular metadata field.

To identify these content-based and metadata-based themes, the parser 114 may be configured to operate based on one or more parsing rules. For example, to identify content-based themes the parser 114 may be configured to operate based on one set of rules and to identify metadata based themes, the parser 114 may be configured to operate based on a different set of rules. The following paragraphs describe some example parsing rules and how the parser 114 may identify themes based on these rules. It will be appreciated that these examples are not exhaustive and illustrate only a few ways in which the parser 114 may be programmed. In practice, these rules may be modified or replaced without departing from the scope of the present disclosure.

Typically, content-based themes can be identified by parsing content into its grammatical elements such as verbs, proper nouns, common nouns, and adjectives, and then selecting one or more of the grammatical elements as themes based on certain predetermined rules. According to one rule, any proper noun(s) identified in the content of an event can be selected as themes, either individually or in combination. In this case, for an event with the content, "does anybody know the API protocols for HipChat?", the parser 114 may deconstruct the sentence into the verb "know", the indefinite pronoun "anybody", and the proper nouns "API Protocols" and "HipChat". Based on this, the content-based themes of this event may be considered to be "API protocols" and "HipChat" or even a combination of the identified proper nouns, "HipChat API Protocols".

According to another rule, content-based themes may be identified based on the frequency of times a proper noun is repeated in the content of an event. In this example, the content is parsed into its constituent grammatical elements, and the proper noun(s) with a threshold number of hits or a maximum number of hits may be considered to be the content-based theme(s) of the event. According to yet another rule, content-based themes may be identified based on the topic or subject sentence of the content (e.g., a combination of the noun(s) identified in the first sentence of the content may be considered the theme(s) of the event).

Although these examples use proper nouns, the present disclosure is not limited to these grammatical elements. In other embodiments, themes may be dependent on verbs, common nouns, adjectives, or a combination of these elements without departing from the scope of the present disclosure.

In certain cases, an event may not have its own content, but it may refer to content of another event. For example, a share or a like event will not include it's own content but may include a pointer to the content that is being shared or liked. In this case, the servers 104 may forward the content or a link to the content liked or shared in the current event. The parser 114 may subsequently identify the themes of such events by parsing the content being liked or shared by such events.

Furthermore, content may from time to time include words with similar meanings (e.g., democracy, democratic, and democratization), different spellings (e.g., organize and organise, or color and colour), or different forms (e.g., organize, organizing, organizes). To account for such variations, the parser 114 may utilize one or more word harmonization rules such as stemming or lemmatization so that these words are not identified as different themes.

In other embodiments, natural language processing may be employed to infer the tone or intent of the content and to determine whether the content is for a particular theme or against it. In case it is identified that the content is against a particular theme, that theme may not be selected even though the underlying pronoun is present in the content. In some implementations, if the content is, for example, "I hate ABC", the parser 114 may determine that the tone of the content is negative and may then create a theme "not ABC" based on the content instead of the theme "ABC".

To identify metadata-based themes, the parser 114 retrieves one or more metadata field values for an event. In certain embodiments, a particular metadata field may be selected based on the event type. For example, if it is determined that an event type is direct communication between two or more user accounts (e.g., via email), the parser may apply a set of rules that selects the people involved in the communication as the theme of the event. Similarly, if the event type relates to communication in a closed group such as a chat room or instant messaging application, the parser 114 may apply a set of rules for object-based themes on the metadata. Using this set of rules, the parser may retrieve the object ID of the event and identify this as the theme for the event.

In some embodiments, a single event may be parsed according to multiple set of rules. For example, content based and object based themes may be identified for a chatroom message. Furthermore, if no themes are identified in from an event, the event may be discarded.

Returning to FIG. 3, at step 306, for each identified theme, it is determined whether the theme has already been identified from other events. To this end, the analyzer 116 compares the theme identified at step 304 with the theme data structure maintained (e.g., table B) by the team management platform 106 in the database 120.

If at step 306, no match is found in the theme data structure for the theme, the parser 114 determines that the theme is new and the method proceeds to step 308 where the parser 114 creates a record for the theme in the theme data structure (e.g., in Table B) and then updates the theme activity database (e.g., table C).

Alternatively, at step 306, if the identified theme matches a theme in the theme data structure, the parser 114 determines that the theme already exists and proceeds to update the theme activity data structure with the corresponding theme ID from the theme data structure at step 310.

Accordingly, using method 300, the team management platform 106 creates a database of themes and the user accounts and events associated with those themes. This database is updated each time the monitoring module 112 receives event information from the servers 104. Furthermore, information stored in this database is subsequently analyzed to perform a number of functions such as creating/updating implicit teams, adding/removing user accounts, upgrading implicit teams to formal teams, or suggesting user accounts to formal teams. These functions will be described in detail in the following sections.

In certain embodiments, the team management platform 106 may construct a content graph from the underlying data, where the nodes of the graph represent themes and user accounts and the edges between nodes represent the relationships between the nodes (based on parsed events). Furthermore, edges may be weighted such that thicker edges represent higher interaction between a user account and a theme (e.g., because the user account mentioned the theme many times in the recent past—measured via the number of events corresponding to the particular user account and theme in table A) whereas thinner edges represent low interaction between a user account and a theme (e.g., because the user account mentioned the theme few times over a period). These interactions may be measured based on a count of the number of events corresponding to a particular user account and a theme in the event data structure. Further still, in case weighting factors are used, the edges may also be weighted based on the weighting factors of the events such that the edge between a user account and a theme is thicker when a larger number of involved events are present and thinner when a small number of less involved events are present.

Process for Creating/Updating Implicit Teams

Figure 4:
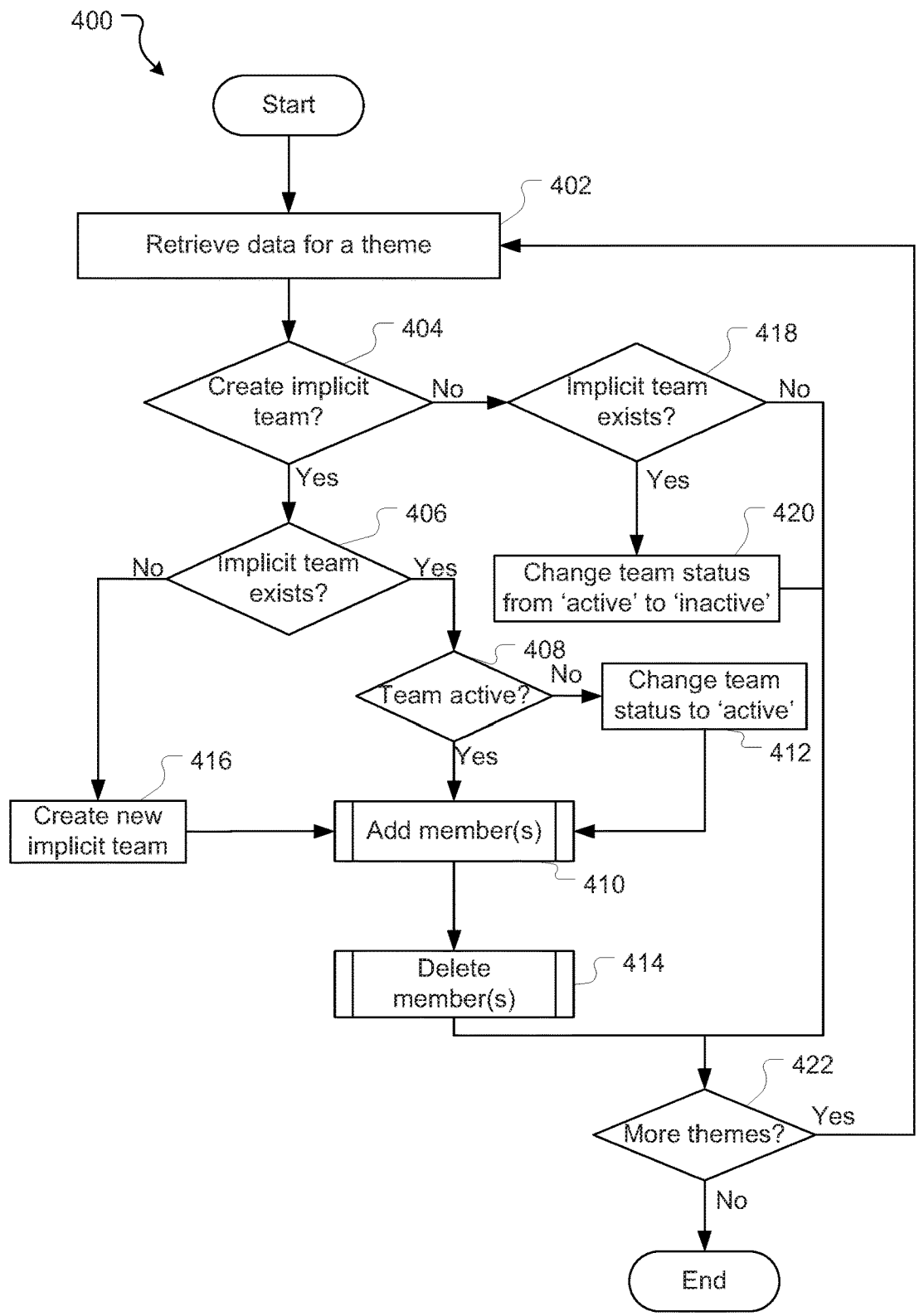
FIG. 4 is a flowchart illustrating a method for creating/updating an implicit team according to some embodiments of the present disclosure.

FIG. 4 illustrates an exemplary method 400 for creating and/or updating implicit teams. In certain embodiments, this method is performed at predetermined intervals, for example, once a day, once every 6 hours, or once every hour, the team management platform 106 and more specifically, the analyzer 116 may analyze the event and theme activity data structures (e.g., tables A and C) to determine whether any new implicit teams need to be created, the status of any teams needs updating, or team information in an existing implicit team needs to be updated.

Method 400 begins at step 402, where theme data corresponding to a particular theme is retrieved. Specifically, the analyzer may retrieve the records in the theme data structure of the selected theme. In some embodiments, all the records may be retrieved whereas in other embodiments, the records corresponding to a particular time frame (e.g., last month) may be retrieved.

At step 404, a determination is made whether implicit team creation criteria are met. Team creation criteria may vary depending on the particular implementation. For example, in some implementations, the team creation criteria could be that the total number of events relating to a theme exceeds a threshold number of events. In other implementations, the team creation criteria could be that the total number of events relating to a theme exceeds a threshold number of events in a particular period of time (e.g., two weeks). In yet other implementations, the team creation criteria could be that a threshold number of different user accounts (e.g., four) be associated with the theme in a certain time period (e.g., one week). Alternatively, the team creation criteria could be that a threshold number of user accounts (e.g., 3) generate a threshold number of events (e.g., 2 events each) corresponding to a theme in a threshold amount of time (e.g., one week). In yet other examples, the team creation criteria could be that a threshold number of user accounts (e.g., 3) generate a particular type of event (e.g., more involved posts, messages, or comments) in a particular period of time (e.g., two weeks), or the frequency of interactions (e.g., 10) between a given set of user accounts (related to a single theme or multiple themes) exceeds a threshold number of interactions in a particular period of time.

Whatever the team creation criteria finally adopted, at step 404, the analyzer 116 analyzes the retrieved theme data to check whether the theme meets the adopted criteria. To that end, the analyzer 116 may calculate values of the factors involved in the adopted criteria such as the number of events, the number of user accounts involved, the types of events, the time period in which the events were generated, etc. Thereafter, the analyzer 116 may compare these calculated values with corresponding threshold values of the team creation criteria to determine whether the theme meets the creation criteria.

If at step 404 it is determined that team creation criteria are met, the method proceeds to step 406, where the analyzer 116 determines whether an implicit team already exists for the theme. To do this, the analyzer 116 may lookup the implicit team data structure (e.g. table F). If an implicit team with a matching identifier is found, the analyzer 116 determines that an implicit team already exists for the theme and the method proceeds to step 408.

At step 408, the analyzer 116 determines whether the team is an active team or an inactive team. This can be done by examining the status of the implicit team in the implicit team data structure (table F). If the status of the team is determined to be active, the method directly proceeds to step 410. Otherwise, the method proceeds to step 412 where the status of the implicit team is changed from 'inactive' to 'active' and then the method proceeds to step 410.

At step 410, the team management platform 106 adds zero or more members to the implicit team. Adding members will be described in detail with reference to FIG. 5, but it generally involves determining if the user account activity of any non-members matches the threshold activity required to be a member of the implicit team and adding the non-members whose activity matches the required threshold activity.

Next, at step 414, the analyzer 116 removes zero or more members from the implicit team. Removing members from the implicit team will be described in detail with reference to FIG. 6, but it generally involves determining if the activity of implicit team members does not meet the threshold activity required to be a member, and removing any such members from the implicit team).

It will be appreciated that in certain cases no user accounts may be added to a team or removed from a team at steps 410 and 414.

Returning to step 406, if it is determined that an implicit team does not exist, the method proceeds to step 416 where a new implicit team is created. In certain embodiments, the implicit team data structure (i.e., table F) may be updated at this stage. Thereafter, the method proceeds to step 410.

Returning step 404, if it is determined that the theme does not meet the adopted implicit team creation criteria, the method proceeds to step 418, where the analyzer 116 determines whether an active implicit team exists for the theme. This may be determined in a manner similar to that used in step 406. If at step 418 it is determined that an active implicit team exists, the analyzer 116 disables the implicit team at step 420 (e.g., by changing the status of the implicit team from 'active' to 'inactive/disabled' in the implicit team data structure).

Alternatively, if at step 418 is it determined that an active implicit team does not exist for the theme, the method proceeds to step 422, where the analyzer determines whether any other themes need to be analyzed.

If other themes need to be analyzed, the method goes back to step 402 and steps 402-416 are repeated for the next theme and the process continues until all the themes in the theme database are analyzed. Once the themes are analyzed, the method 400 ends.

This method assumes that the criteria for creating and removing implicit teams are the same—i.e., if a team does not meet the creation criteria, it should not be an active implicit team. However, in other implementations, the criteria for disabling implicit teams may be different than the criteria for creating teams. In such cases, either steps 414-416 may be deleted from method 400 or an additional check may be performed between steps 414 and 416 to determine whether the existing implicit team should be disabled (e.g., because it meets the disablement criteria). For example, the activity of a team may be analyzed (by calculating a team activity score based on event records corresponding to the theme) to determine whether the team activity meets the disablement criteria or not.

Furthermore, in the embodiments described above, the team creation criterion is static. In some embodiments, the team creation criteria may be dynamic, i.e., it may evolve/change over time. To this end, the team management platform 106 may analyze the conversion rate of themes into teams, the usage of implicit teams, and/or the conversion of implicit teams into standard teams and based on this review, automatically update team creation criteria. For example, if the team management platform 106 determines that a majority (e.g., more than 55%) of the created implicit teams fluctuate between 'active' and 'inactive states' several times in a particular window (e.g., 15 days), the value of the threshold score for creating implicit teams may be increased. Alternatively, if it is determined that a small percentage (e.g., 20%) of themes are converted into implicit teams, the value of the threshold score for creating implicit teams may be decreased. Similarly, if the threshold score is determined based on a weighting of a number of different factors such as number of user accounts associated with the theme, number of hits, number of interactions etc., the weighting of individual factors may be automatically updated based on usage and/or conversion rate of implicit teams.

Implicit Team Membership Management

As described previously, implicit teams are dynamic, i.e., user accounts may be added to or removed from these teams (depending on their activity). Generally speaking, if a user account increases their activity associated with a particular theme (which is associated with an implicit team), the user account may be added as a member of the team. Alternatively, if a user account (who is already a member of an implicit team) reduces his/her activity associated with the theme of that implicit team, the user account may be automatically removed from the implicit team.

Figure 5:
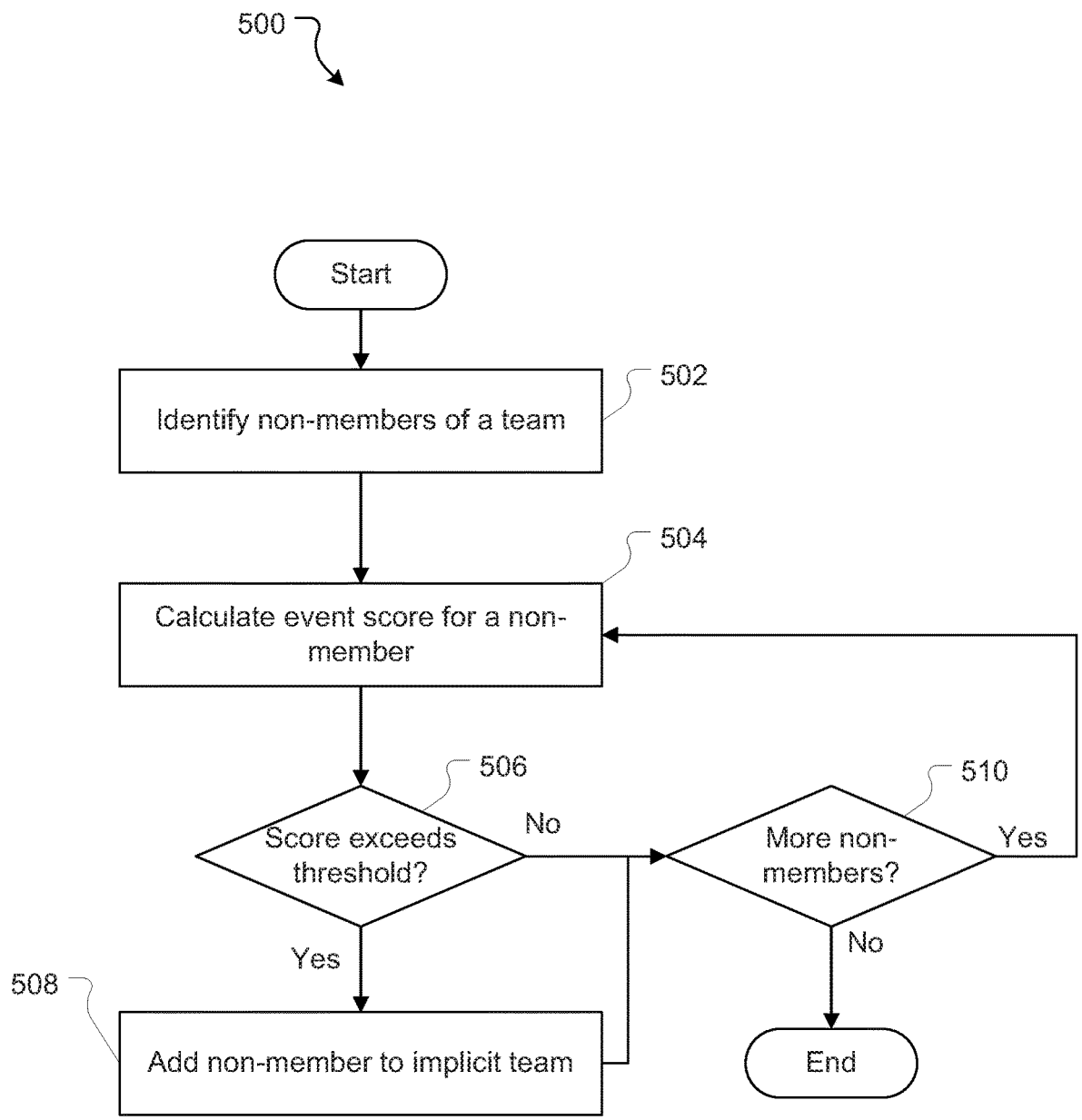
FIG. 5 is a flowchart illustrating a method for adding a member to an implicit team according to some embodiments of the present disclosure.

FIG. 5 illustrates an example method 500 for adding members to an implicit team. To implement this, the team management platform 106 is configured to determine whether user account activity associated with a particular theme satisfies user addition criteria. As noted previously, the criteria may be configured as required. In one example, user addition criteria may require user account activity associated with a particular theme to meet a threshold activity value for the user account to be added. In another example, user addition criteria may require user account activity associated with a particular theme to meet a threshold activity value during a predetermined rolling time window for the user account to be added. Further, the user addition criteria may be based on acceleration in a particular type of activity (e.g., more involved interactions) or the frequency of interactions (e.g., 10) between a given user account and members of the implicit team exceeds a threshold number of interactions in a particular period of time.

The method begins at step 502, where the analyzer 116 identifies non-member user accounts for an implicit team. Non-member user accounts may be determined by comparing a list of user accounts associated with the theme (obtained from the event and theme activity data structures) with a list of members of the corresponding implicit team (obtained from the team membership data structure). The user accounts that are associated with the theme but that are not part of the member list are identified as non-members.

Next, at step 504, the analyzer calculates an event score for a particular non-member from the list of non-members generated at step 502. The score may be calculated based on a number of different factors. For example, the score may be a simple addition of the number of events generated by the user account for that particular theme. If weighted factors are used, each event may be weighted based on its associated weighting factor and the total score may be calculated by adding the weighted events. In certain embodiments, the scores may be time-based—i.e., when calculating a score, the analyzer may only consider events in a particular time window (e.g., last two weeks) and disregard events outside this window or exponentially decay the relevance of such events, so that they make a marginal contribution (if any) to the final calculated scores. This is done so that user accounts with high activity in the past are not considered as potential members if they have negligible activity in the present.

At step 506, the analyzer determines whether the calculated score exceeds a predetermined threshold score. If the analyzer 116 determines that the calculated score exceeds a threshold score, the non-member is considered a candidate member for the implicit team and the method proceeds to step 508, where the user account is added to the implicit team (e.g., by adding user account information in the team membership data structure and adding the present date as the date the user account joined the team).

On the other hand, at step 506, if it is determined that the calculated score does not exceed the threshold score, the method proceeds to step 510 where the analyzer 116 determines if any other user accounts exist in the list retrieved at step 502. If other user accounts exist, the method returns to step 504 and the process is repeated until all the user accounts in the list are assessed.

Figure 6:
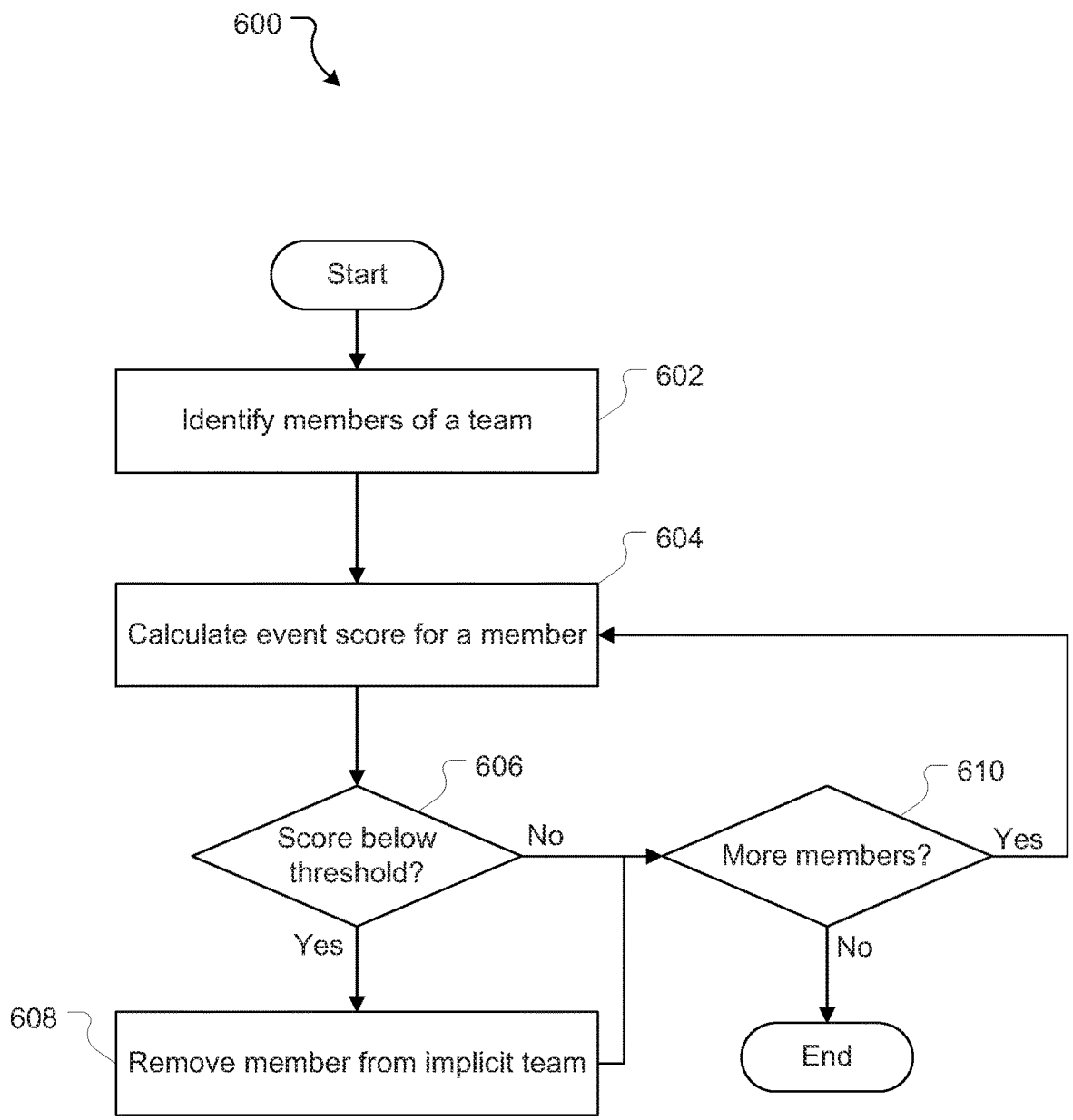
FIG. 6 is a flowchart illustrating a method for removing a member from an implicit team according to some embodiments of the present disclosure.

FIG. 6 illustrates an exemplary method 600 for deleting one or more existing user accounts from an implicit team. As noted previously, if user account activity associated with the theme of an implicit team reduces to below a threshold value, the user account may be removed from that team. For example, if the user account fails to mention the team name, share articles with the team, or generate activity corresponding to the theme of the team, the user account may be removed.

FIG. 6 begins at step 602, where a list of team members is retrieved. The list of team members may be retrieved from the team membership data structure (e.g., table G).

At step 604, for a particular implicit team member, the analyzer 116 calculates an event score. The score may be calculated in a manner similar to that in step 504 of FIG. 5 (e.g., based on number of events generated by the user account for the associated theme in a time frame, the types of events, or the frequency of interactions between a given user account and members of the implicit team in a particular period of time).

At step 606, a determination is made whether the score is below a threshold removal score. If the analyzer 116 determines that the calculated score is below the threshold removal score, the user account is removed from the implicit team at step 608. In certain embodiments, members may be removed from implicit teams by flagging the status field in the team membership data structure for the user account as "removed/inactive" and adding the present date as the date the user account was removed or became inactive).

Alternatively, if at step 606 it is determined that the score exceeds the removal threshold score, the method proceeds to step 610, where the analyzer 116 determines if any other members remain to be assessed in the list retrieved at step 602. If other members exist, the method returns to step 604 and the process is repeated until all the members in the list are assessed.

Figure 7:
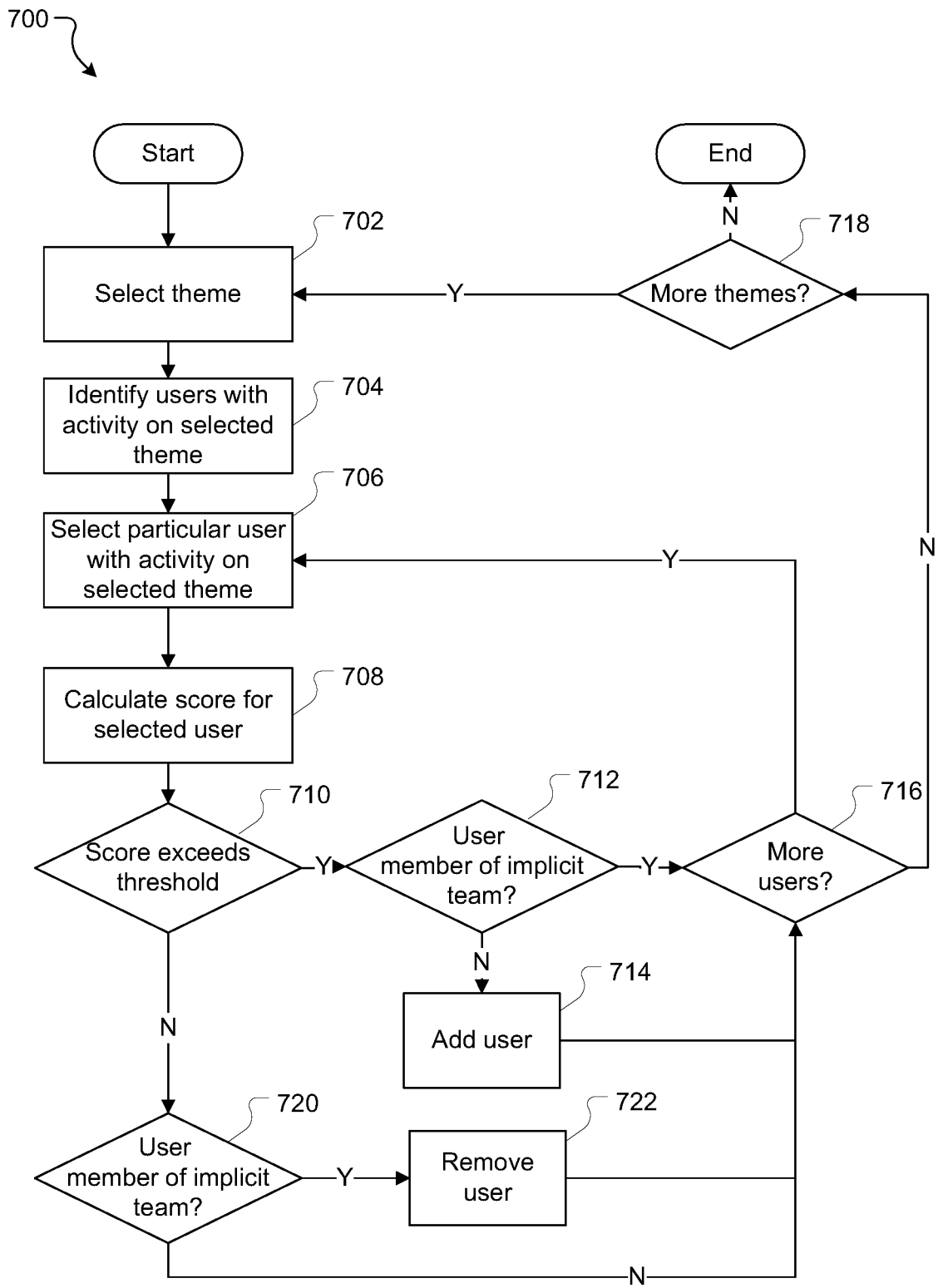
FIG. 7 is a flowchart illustrating a method for updating membership of an implicit team according to some embodiments of the present disclosure.

In the example implementations described above, separate processes 500 and 600 are invoked to determine member addition and removal from a team. In other implementations, member addition and/or removal may be handled in a single process. FIG. 7 illustrates an example of such a method 700.

The method 700 begins at step 702, where a particular theme from the themes maintained by the team management platform is selected. In certain embodiments, the theme is selected from the subset of themes that have a corresponding active implicit team. Themes that do not have an implicit team or have a inactive/disabled implicit team are ignored.

Next (at step 704), user accounts associated with the theme are identified. In certain embodiments, the analyzer 116 identifies the user accounts associated with the selected theme from the event and theme activity data structures (e.g., tables A and C).

From the identified user accounts, a particular user account is selected at step 706, and a score is calculated for the selected user account at step 708. The score may be calculated in a manner similar to that described with reference to FIGS. 5 and/or 6 (i.e., based on the user account activity with relation to that selected theme).

Next (at step 710), it is determined whether the calculated score exceeds a user account addition threshold score. If it is determined that the calculated score exceeds the threshold score, the method proceeds to step 712 where it is determined whether the user account is a member of the implicit team associated with the theme. This may be identified by comparing the user account ID of the user with the user account IDs of the members of the implicit team stored in the implicit team membership data structure (table G).

If it is determined that the user account is not a member of the implicit team, the method proceeds to step 714, where the user account is added to the team. Thereafter, the team management platform determines if any more user accounts need to be assessed for this particular theme at step 716. If more user accounts need assessment, the method returns to step 706. Otherwise, the method proceeds to step 718, where it is determined whether any other themes need to be assessed.

If other themes need to be assessed, the method returns to step 702, otherwise, it ends.

Returning to step 712, if it is determined that the user account is already a member of the implicit team, the method directly proceeds to step 716.

Further, returning to step 710, if it is determined that the calculated score is lower than the threshold score, the method proceeds to step 720, where it is determined whether the user account is currently a member of the implicit team. This step is similar to step 712.

If at 720 the analyzer 116 determines that the user account is a member of the implicit team (and, per 710, the user account's score is not equal or greater to the threshold), the user account is removed from the list of members of the implicit team. This may be done, e.g., by updating the last removed date corresponding to the user account in the implicit team membership data structure. Thereafter, the method proceeds to step 716.

Alternatively, if the analyzer 116 determines that the user account is not a member of the implicit team at step 720, the method directly proceeds to step 716.

Method 700 assumes that the team addition and removal criteria are the same. However, in some cases, the team addition criteria may be stricter than the team removal criteria—i.e., a lower threshold score may be sufficient to remain a member of a team. If this is the case, the team management platform 106 may determine whether the calculated user account score exceeds a team removal threshold score after determining that the user account score is below the addition score but the user account is a member (i.e., after step 720). If the scores are higher than the removal threshold score, nothing is done. But, if the user account scores are below the removal threshold score, the user account may be removed from the implicit team (at step 722) as described above with reference to FIGS. 5 and 6.

Furthermore, in the embodiments described above, the team addition and removal criteria are static. In some embodiments, these may be dynamic, i.e., they may evolve/change over time. To this end, the team management platform 106 may analyze usage of implicit teams by members, their addition and/or removal rates and based on this analysis, automatically update team addition and/or removal criteria. For example, if the team management platform 106 determines that the state of a majority (e.g., more than 55%) of implicit team members fluctuates between 'active' and 'inactive' states several times in a particular window (e.g., 15 days), the value of the threshold score for adding team members may be increased or the threshold score for removing members may be decreased. Alternatively, if it is determined that a small percentage (e.g., 20%) of user accounts are added as team members to implicit teams, the value of the threshold score (e.g., minimum number of interactions by a user account) for adding a member may be decreased. It will be appreciated that data corresponding to member addition/removal from implicit teams may be utilized in a number of other ways to automatically update the member addition/removal criteria without departing from the scope of the present disclosure.

Although the processes to add and remove members to an implicit team as described with respect to FIGS. 5-7 are described as sub-processes of process 400, these processes can also be performed independently (at other times). For example, the processes for adding and/or removing members from an implicit team (as described in FIGS. 5-7) may be performed independently at predetermined intervals (e.g., daily, every two days, weekly, etc.), or when requested (e.g., if a user account requests to refresh a team profile).

Process for Formalizing Implicit Teams

It may be useful to formalize implicit teams that are actively used by members. For example, if members of an implicit team share information with other team members by "mentioning" the team or "sharing" content with other team members, they may consider formalizing the team to get additional features (such as team access permissions and more control over team membership).

Figure 8:
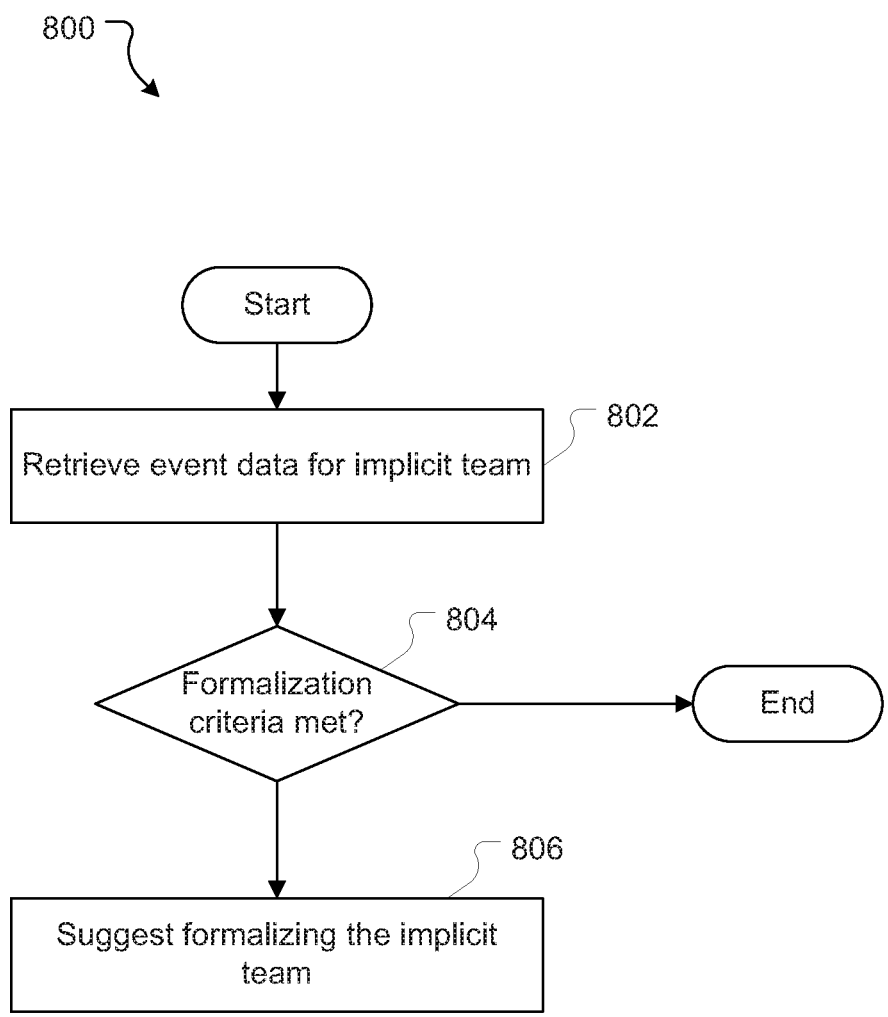
FIG. 8 is a flowchart illustrating a method for updating the status of an implicit team according to some embodiments of the present disclosure.

FIG. 8 illustrates an exemplary method for formalizing an implicit team. The method begins at step 802, where event data associated with a particular implicit team is retrieved. Particularly, event data corresponding to active members of the implicit team may be retrieved.

In certain embodiments, the analyzer may examine the event type IDs and only retrieve event data corresponding to the event types that represent usage of the implicit team. These event types include, for example, the "share" and "mention" event types. It is assumed that any share or mention events associated with an implicit team are events where members have either mentioned the implicit team or shared content with the implicit team.

In other embodiments, event data for all types of events corresponding to active members of the implicit team are retrieved.

At step 804, the retrieved team data is analyzed to determine whether the team matches a formalization criterion. In some embodiments, the formalization criteria may be that the number of times the team name/handle is used (i.e., number of time "mention" or "share" events are generated by team members) in a predetermined period exceeds a threshold number. In other embodiments, the formalization criteria may be that at least a threshold number of members (e.g., three) utilize the team name/handle (i.e., generate "mention" or "share" events) a threshold number of times (e.g., 10) in a predetermined time frame (e.g., 2 weeks).

In certain embodiments, the team management platform 104 may calculate a team activity score at step 804 based at least in part on the number of event records retrieved at step 802. This score may be compared with a threshold team activity score to determine whether the team matches a formalization criterion. For example, if the team activity score is higher than the threshold score, it may be determined that the team formalization criterion has been met.

If at step 804, it is determined that the activity with respect to the implicit team does not meet the formalization criteria, the method ends. Alternatively, if it is determined that the implicit team meets the formalization criteria, the method proceeds to step 806 where the UI module 122 sends a suggestion to members of the implicit team to formalize the team as the team is being utilized sufficiently. In certain embodiments, the suggestion message may be sent only to the members that made a threshold contribution. In other embodiments, the suggestion message may be sent to all the members.

Thereafter, the team may be formalized using known techniques if the members agree to formalize the team—i.e., the members may select an administrator who may assign permissions to the team and manage the addition/removal of members to/from the team. If the team is formalized, the team management platform at step 708 may update the status of the team in the implicit team data structure (table F) from 'active' to 'formalized'. This indicates that user accounts can no longer be automatically added to or removed from the team by the team management platform 106 and the team cannot be automatically disabled by the team management platform. Moreover, the member that is the administrator of the team may be flagged in the team membership data structure as the administrator.

This method may be performed at predetermined intervals (e.g., once a week) or when requested. Moreover, the method may be repeated for other implicit teams maintained by the team management platform 106. If members of an implicit team decide not to formalize the team (e.g., in response to receiving the suggestion), the team management platform 106 may flag the implicit team to indicate that formalization is not desired for that team. In this case, the team management platform 106 may skip this implicit team when determining whether any implicit teams should be formalized.

If members change their mind at a later stage, they may request formalization from the team user interface rendered by their client application 103. At that stage, the team management platform 106 may perform method 800 and if the implicit team meets the formalization criteria, the implicit team may be formalized or a request may be sent to members to initiate formalization.

Furthermore, once an implicit team is formalized, the team management platform may provide information about the team to a platform/system/module that manages formal teams. From time to time, the team management platform 106 may communicate with the formal system to exchange data, such as information about user accounts that may be interested in being members of the formal team.

Process for Suggesting Formalized Teams

Figure 9:
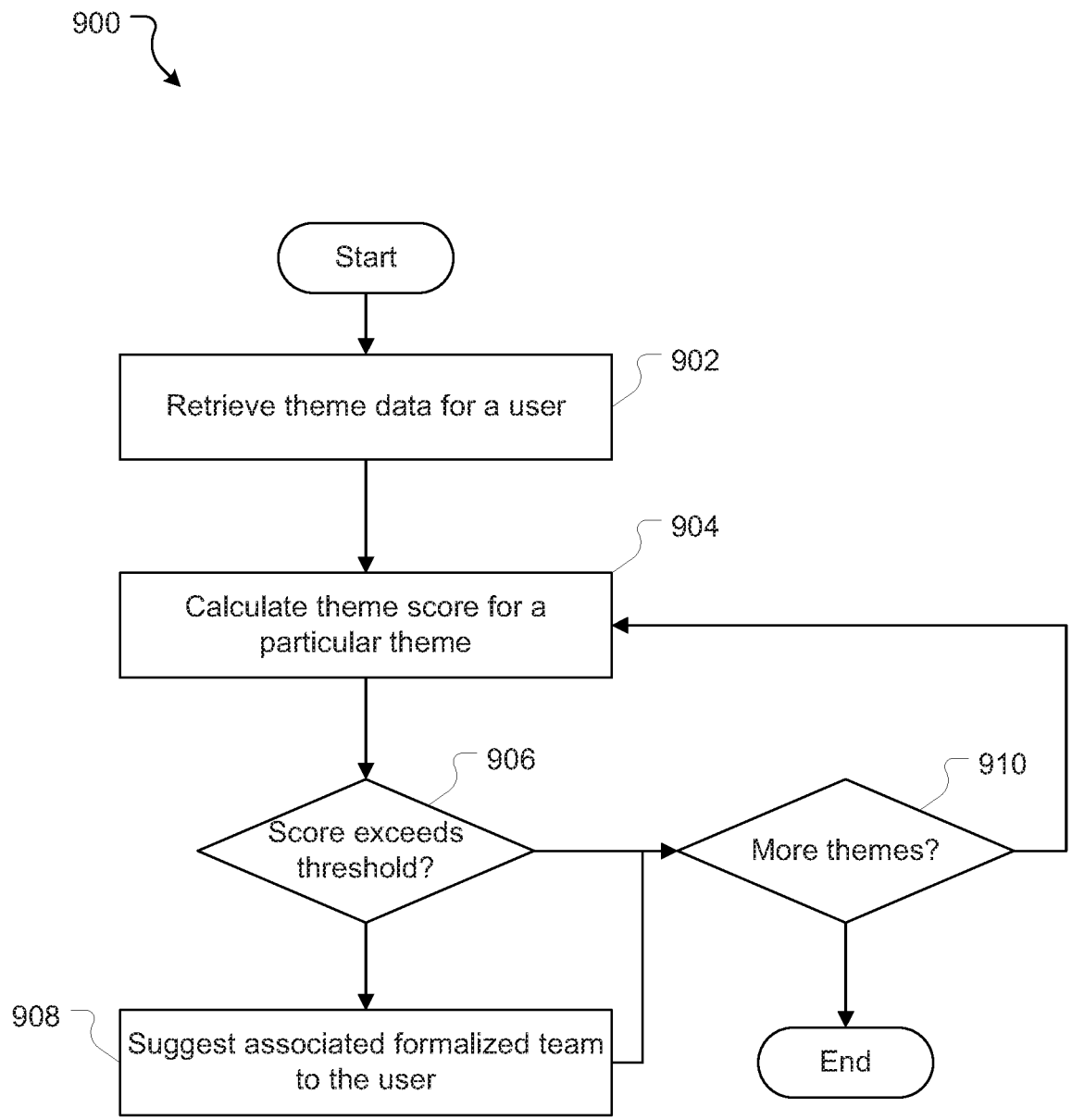
FIG. 9 is a flowchart illustrating a method for suggesting a formal team to a user account according to some embodiments of the present disclosure.

FIG. 9 is a flowchart illustrating an exemplary process to suggest one or more formalized teams to a user account. The method begins at step 902, where theme and corresponding event data for a particular user account is retrieved from the theme activity data structure and the event data structure. In one embodiment, the team management platform retrieves data for all events corresponding to a user account (over a predetermined time period). In other embodiments, the team management platform 106 (and particularly the analyzer 116) may retrieve a selection of event data. For example, it may identify all the themes the user account has contributed towards in a predetermined period of time and only retrieve event data corresponding to those themes that are associated with formal teams that the user account is not a member of.

This method is described with respect to the embodiment where a selection of events is retrieved. However, it will be appreciated that the method can be modified to account for the embodiment where all events are retrieved or any other similar embodiments.

At step 904, a theme score is calculated for a particular theme associated with a formalized team. To that end, the analyzer may identify the events corresponding to the theme and determine, e.g., the number of events generated by the user account for the particular theme, the type of events, the weighting factors associated with those events (if any) and/or the time when those events were generated. Using this information a theme score may be calculated for the theme. The theme score may be similar to the event scores calculated in methods 500 and/or 600.

Next (at step 906), the team management platform 106 determines whether the theme score exceeds a predetermined suggestion threshold score. If the threshold score is exceeded, the method proceeds to step 908, where the team management platform and more specifically the UI module 122 notifies the user account (e.g., via the implicit team user interface, email, or message) of the formalized team and suggests the user account become a member of the team or follow the team (if possible).

If at step 906 it is determined that the theme score does not exceed the threshold score, the method proceeds to step 910 where the analyzer 116 determines whether more themes need to be assessed. If more themes require assessing, the method returns to step 904 and steps 904-910 are repeated until no more themes require assessing.

At step 910, if it is determined that no more themes need to be assessed, the method ends.

Instead of/or in addition to suggesting formalized teams to user accounts, the system may be configured to suggest adding one or more user accounts to a formalized team. This process may be similar to the process 500 of adding a new user account to an implicit team, but instead of automatically adding a member, a suggestion may be made to the team to invite the identified user account to be a member of the team.

User Interface

FIG. 10 illustrates an exemplary user interface 1000 rendered on a client device to display one or more implicit teams that a user account is a member of and/or may be interested in. The user interface 1000 includes a personal implicit team area 1002 and a team profile area 1004.

A user account may sign-in to the team management platform client application 103. The client information may subsequently forward user account information to the team management platform 106. Using the user account information, the UI module 122 may retrieve a list of active implicit teams that the user account is a member of by performing a lookup with the user account ID in the implicit team membership data structure. Next, the UI module 122 may retrieve the latest event data (e.g., last 5 events, the last 5 "mention" or "share event", or events in the last day) for the identified teams from the event and theme activity data structures. This information may be displayed in the personal implicit team area 1002.

If the user account selects any one of the personal implicit teams in the area 1002, more information about the team may be rendered in the team profile area 1004. This information may include active team members, total number of events, associated theme, and more team events (e.g., events in the last month or last 3 months). In FIG. 10, implicit team "HipChat APIs" is selected in the area 1002, which renders the profile of this team in area 904 as represented. The information required to render the team profile may be retrieved from the team management platform once the implicit team is selected.

In addition to information about a user account's personal active implicit teams, the user interface in some embodiments may also display additional information such as information about the user account's disabled implicit teams, implicit teams that the user account is no longer a member of, the user account's formalized teams, formal team suggestions, trending implicit teams, and/or statistics on user account activity in the implicit teams.

In addition to displaying team information, the user interface 900 may also allow a user account to manage their implicit teams. For example, a user account may be able to request removal of himself/herself from an implicit team from the team profile area, the user account may also be able to action any suggestions for formalizing teams or becoming a member of a formal team.

In this disclosure various criteria are described for creating and managing implicit teams and for suggesting teams to user account or vice versa. These criteria may be static (i.e., factors used to determine criteria scores and the threshold scores themselves may be fixed) or dynamic (i.e., the factors and threshold scores may be updated over time). Examples are provided for dynamically updating team creation and management criteria. It will be appreciated that similar examples are applicable for the other described criteria and any of these may be dynamically updated based on analysis of theme and/or team data.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for adding a user to a team in a team management platform, the method comprising:
    accessing, by the team management platform, event records corresponding to a user's online interactions with data objects provided by the team management platform;
    analyzing the event records to identify a set of themes represented in the user's online interactions with the data objects, each theme corresponding to a team comprising additional users of the team management platform;
    determining an activity score for the user with respect to a theme, the activity score based on an analysis of the user's online interactions with respect to a set of data objects associated with the theme;
    in response to the activity score exceeding a first threshold adding the user to a team associated with the theme, the team having an implicit status;
    in response to adding the user to the team:
        configuring the team management platform to provide the user with access to a set of digital content associated with the team, the access allowing the user to view, comment and add to the set of digital content; and
        displaying a portion of a feed associated with the set of data objects in a graphical user interface for review by the user;
    in response to determining that a team activity score exceeds a second threshold, changing the team from the implicit status to a formalized status; and
    in response to the team changing from the implicit status to the formalized status, configuring the team management platform to provide the user with at least on of an additional access permission to access the set of digital content associated with the team or control over team membership.

2. The method of claim 1, wherein the first threshold is automatically updated based on the at least one of the number of users added to the team within a predetermined time period or the number of users removed from the team within the predetermined time period.

3. The method of claim 2, wherein automatically updating the first threshold comprises decreasing the first threshold if the number of users added to the team within the predetermined time period is below a threshold value.

4. The method of claim 2, wherein automatically updating the first threshold comprises increasing the first threshold if the number of users added to the team within the predetermined time period is above a threshold value.

5. The method of claim 1, wherein determining the activity score comprises:
    for each event record in the set of event records:
        determining an event time;
        determining a weighting factor based on the event time; and
        determining an event score based on the weighting factor; and
    adding the event scores for each event record in the set of event records to determine the activity score.

6. The method of claim 5, wherein the weighting factor decreases exponentially as the event time becomes farther from a current time.

7. The method of claim 1, wherein determining the activity score comprises:
    for each event record in the event records:
        determining an event type from a set of event types;
        determining a weighting factor corresponding to the event type; and
        determining an event score for the event based on the weighting factor; and
    adding the event scores for each event record in the set of event records to determine the activity score.

8. A computer-implemented method for adding a user to a team in a team management platform, the method comprising:
    querying one or more computer databases in a distributed computing environment to obtain event records corresponding to a user's online interactions with data objects provided by the team management platform;
    identifying, from the event records, a theme represented in the user's online interactions with the data objects;
    determining an activity score for the user with respect to the theme, the activity score based on an analysis of the user's online interactions with respect to a set of data objects associated with the theme;
    in response to the activity score exceeding a first threshold adding the user to a team associated with the theme, the team having an implicit status;
    in response to adding the user to the team:
        configuring the team management platform to provide the user with access to a set of digital content associated with the team, the access allowing the user to view, comment and add to the set of digital content; and
        displaying a portion of a feed associated with the set of data objects in a graphical user interface for review by the user;

in response to determining that a team activity score exceeds a second threshold, changing the team from the implicit status to a formalized status; and in response to the team changing from the implicit status to the formalized status, configuring the team management platform to provide the user with at least on of an additional access permission to access the set of digital content associated with the team or control over team membership.

9. The method of claim 8, wherein:

the first threshold is a first dynamic activity threshold;

the event records is a first set of event records;

the activity score is a first time-weighted activity score; and the method further comprises:

determining a second dynamic activity threshold for removing the user from the team, the second dynamic activity threshold different from the first dynamic activity threshold;

identifying a second set of event records corresponding to the theme;

determining a second time-weighted activity score based on the second set of event records; and responsive to the second time-weighted activity score not exceeding the second dynamic activity threshold, removing the user from the team.

10. The method of claim 9, wherein the second set of event records comprises the first set of event records and at least one event record generated after the user is added to the team.

11. The method of claim 8, wherein determining the activity score comprises:

for each event record in the set of event records:

determining an event time;

determining a weighting factor based on the event time; and determining an event score based on the weighting factor; and adding the event scores for each event record in the set of event records to determine a time-weighted activity score.

12. The method of claim 11, wherein:

a first event record having a first event time within a predetermined time window has a first weighting factor; and a second event record having a second event time that is not within the predetermined time window has a second weighting factor less than the first weighting factor.

13. The method of claim 11, wherein:

the weighting factor is a first weighting factor; and determining the time-weighted activity score further comprises, for each event record in the set of event records:

determining an event type from a set of event types;

determining a second weighting factor corresponding to the event type; and determining the event score based on the first weighting factor and the second weighting factor.

14. A computer-implemented method for suggesting user groups in a distributed computing environment, the method comprising:

accessing a first set of event records;

providing the first set of event records as input to a parser configured to apply a parsing rule to input received at the parser;

receiving as output from the parser a selected theme characterizing a common feature of each event record of the first set of event records, the selected theme based on at least one of one of metadata or content of the first set of event records;

determining an activity score for the user with respect to a theme, the activity score based on an analysis of the user's online interactions with respect to the first set of event records associated with the theme;

in response to the activity score exceeding a first threshold adding the user to a team associated with the theme, the team having an implicit status;

in response to adding the user to the team:

providing the user with access to a set of digital content associated with the team, the access allowing the user to view, comment and add to the set of digital content; and displaying a portion of a feed associated with the set of digital content in a graphical user interface for review by the user;

in response to determining that a team activity score exceeds a second threshold, changing the team from the implicit status to a formalized status; and in response to the team changing from the implicit status to the formalized status, configuring the team management platform to provide the user with at least on of an additional access permission to access the set of digital content associated with the team or control over team membership.

15. The method of claim 14, wherein:

the first threshold is automatically updated based on the at least one of a number of users added to the team within a predetermined time period or the number of users removed from the team within the predetermined time period; and automatically updating the first threshold comprises:

decreasing the first threshold if the number of users added to the team within the predetermined time period is below a threshold value; and increasing the first threshold if the number of users added to the team within the predetermined time period is above the threshold value.

16. The method of claim 14, wherein determining the activity score comprises:

for each event record in a second set of event records:

determining an event time;

determining a weighting factor based on the event time; and determining an event score based on the weighting factor; and adding the event scores for each event record in the second set of event records to determine the activity score.

17. The method of claim 16, wherein:

a first event record having a first event time within a predetermined time window has a first weighting factor; and a second event record having a second event time that is not within the predetermined time window has a second weighting factor less than the first weighting factor.

18. The method of claim 17, wherein the second weighting factor decays exponentially as a difference between the second event time and a start time of the predetermined time window increases.

19. The method of claim 14, wherein determining the activity score comprises:

for each event record in a second set of event records:

determining an event type from a set of event types;

determining a weighting factor corresponding to the event type; and determining an event score for the event based on the weighting factor; and adding the event scores for each event record in the second set of event records to determine the activity score.

\* \* \* \* \*